Dec. 29, 1964 W. J. SPAVEN 3,163,818
DIGITAL Q METER
Filed March 27, 1961

WILLIAM J. SPAVEN
INVENTOR.

BY
ATTORNEYS

3,163,818
DIGITAL Q METER
William J. Spaven, Pompton Plains, N.J., assignor to General Precision, Inc., Little Falls, N.J., a corporation of Delaware
Filed Mar. 27, 1961, Ser. No. 98,473
2 Claims. (Cl. 324—57)

The present invention relates to Q measurement, and more particularly to a device which will provide a digital display of the value of Q. The particular approach lends itself to measuring Q values which exceed the capability of known Q measuring devices.

The general state of the art may best be summarized by quoting from the inventor's own article entitled "High Q Measurement" which appeared in the November 1952 issue of "Electronics" magazine.

"High Values of Q (in excess of 1,000) cannot easily be determined under steady-state conditions, however, the transient characteristics of a resonant circuit suggests a method.

"When a series resonant circuit is excited by a unit impulse, a train of damped oscillations is generated. . . . The amplitude of the envelope of this wave train at time $t_1$ may be expressed as $$A_1 = A_0 e^{-\frac{Rt_1}{2L}} \quad (1)$$

where $A_1$ = the amplitude of the envelope at time $t_1$, $A_0$ = the amplitude of the envelope immediately following excitation, $R$ = total equivalent series resistance of the circuit, and $L$ = the equivalent series inductance of the circuit.

"The Q of a shock-excited series circuit may be expressed by $$Q = \frac{2\pi f_0 L}{R} \quad (2)$$

where $f_0$ is the natural series resonant frequency. Combining Equations 1 and 2 and chosing an excitation pulse repetition frequency such that $$PRF = 1/t_1$$

then $$Q = \left(-\frac{\pi}{\ln(A_1/A_0)}\right)\left(\frac{f_0}{PRF}\right) \quad (3)"$$

The arrangement heretofore described by the inventor in 1952 required either mathematical or graphic computation in order to provide the Q value. Although many attempts have been made to provide instantaneously a high Q digital value without any mathematical computation, none, as far as I am aware has even been successful when carried into practice on an industrial scale.

Thus, the object of the present invention is to provide a Q measuring device of economical and simple construction with a digital display capable of high Q measurements.

With the foregoing object and brief description in view, the invention resides in the novel steps, arrangements and combinations thereof hereinafter described, it being understood that changes in the precise embodiment of the invention herein disclosed may be made within the scope of what is described without departing from the spirit of the invention. The invention as well as other objects and advantages will become more apparent from the following description taken in conjunction with the accompanying drawing in which.

Figure 3:
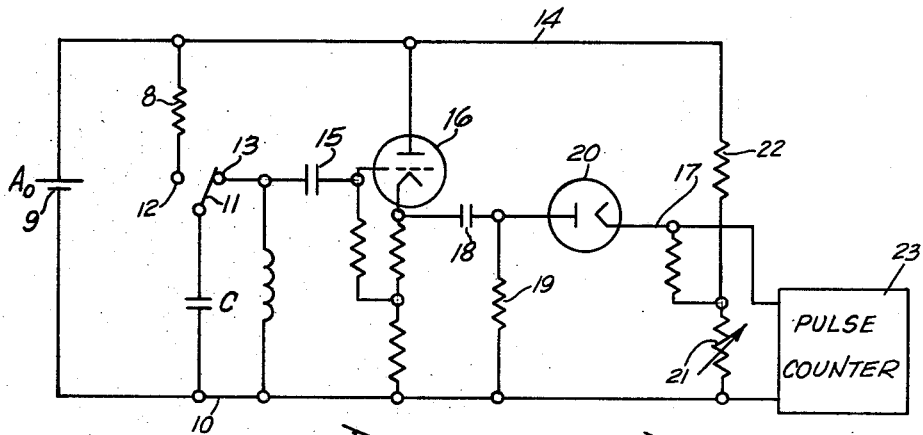
Figure 1:
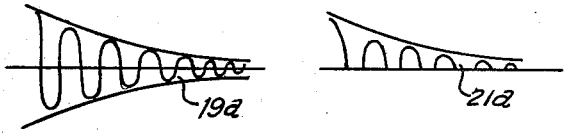
FIGURE 1 is a simple schematic diagram of the arrangement contemplated herein.
Figure 1:
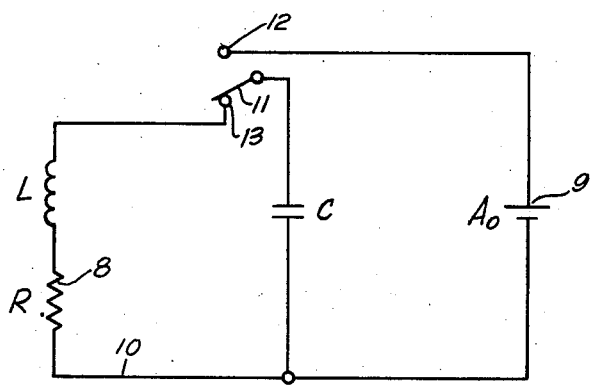
Figure 2:
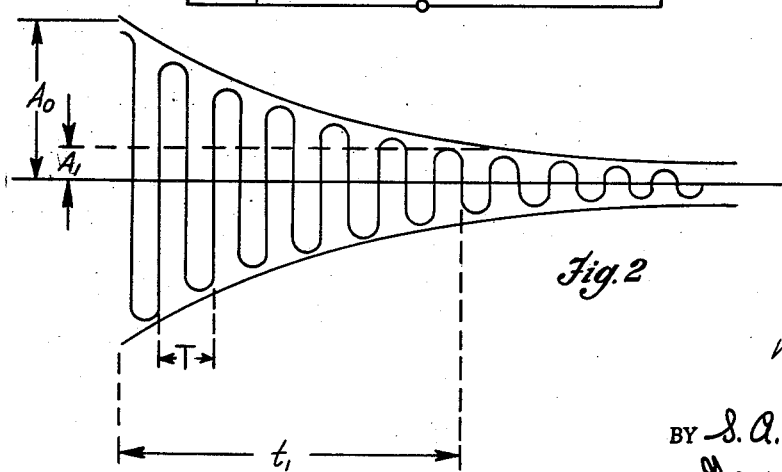
FIGURE 2 illustrates a portion of a damped oscillatory wave which is provided by the circuit depicted in FIGURE 1; and, FIGURE 3 is a detailed schematic diagram of the invention contemplated herein.

Broadly stated, the present invention contemplates ringing an LC circuit 10 to produce a damped wave train shown in FIGURE 2 and the measurement of the number of cycles of the exponentially decaying sinusoidal waveform which have a peak amplitude above a predetermined level $A_1$, at a time $t_1$ after ringing the LC circuit. With proper circuitry, the number of cycles N occurring during the interval $t_1$ will be a function of the Q of the LC circuit, i.e., referring to the drawing, initially, the switch 11 is in position 12 and the capacitor charges to the potential $A_0$. Moving the switch to position 13 causes the charge in the capacitor to discharge through L resulting in the damped oscillation illustrated in FIGURE 2. The number of cycles of the oscillation above a predetermined level are proportional to the Q. If the predetermined level is properly selected, the number of cycles will be numerically equal to the Q of the LC circuit.

The problem therefore is to determine a proper value $A_1$ for FIGURE 2 so that the number of cycles N after the initial ringing of the LC circuit will be equal to Q, where, $A_0$ is the value of the peak amplitude of the sinusoidal waveform for the first cycle of the transient.

$A_1$ is the amplitude of the envelope at time $t$.

$t_1$ is the time in seconds from the initial condition $A_0$ to the point of measurement.

T is the time period of one cycle having a frequency of $f_0$.

R is the series equivalent resistance of the tuned circuit.

L and C are respectively the inductance and capacitance of the circuit under test.

$e$ is the base for Napierian logarithm (2.718).

ln is a logarithm to the base $e$.

Q is the factor of merit of the circuit under test.

$f_0$ is the natural resonant frequency of the circuit under test.

As hereinbefore stated, $$A_1 = A_0 e^{-\frac{Rt_1}{2L}} \quad (1)$$

by rearranging, $$\frac{2L}{R} = \frac{t_1}{\ln \frac{A_0}{A_1}} \quad (2)$$

By definition, $$Q = \frac{2\pi f_0 L}{R} \quad (3)$$

where $$f_0 = \frac{1}{2\pi\sqrt{LC}}$$

Substituting Equation 2 in 3

$$Q = \frac{\pi f_0 t}{\ln(A_0/A_1)} \quad (4)$$

Also $$T = \frac{1}{f_0} \quad (5)$$

Then $$Q = \frac{\pi \frac{t_1}{T}}{\ln(A_0/A_1)} \quad (6)$$

The number of cycles N of oscillation during the time $t_1$ is equal to $$N = t_1/T \quad (7)$$

Then $$Q = \frac{\pi N}{\ln (A_0/A_1)} \quad (8)$$

And, to obtain a direct Q reading, it is necessary that $$Q = N \quad (9)$$

or that $$\ln (A_0/A_1) = \pi \quad (10)$$

Therefore $$A_1 = 0.0432 \, A_0 \quad (11)$$

In carrying out the foregoing concept into practice, there is provided a power source 9 capable of delivering a voltage $A_0$ to the capacitor of the LC circuit 10 under test, when switch 11 is in position 12. A resistance 8 is required to provide the necessary voltage drop across the capacitor C. Upon switching to position 13, the capacitor is in the circuit with the inductance coil L and the tank circuit LC will start oscillation across triode amplifier stage 14, having capacitor 15 and amplifier tube 16 furnishing an output to a clipper stage 17. Here a second capacitor 18 and a resistor 19 will produce the waveform shown as 19a. In parallel with resistor 19 is an amplitude discriminator 20 shown as a diode tube. A resistor voltage divider comprised of resistors 21 and 22 developes a bias potential equal to $A_1$ in the diode 20 so that only that portion of the damped sinusoidal waveform which exceeds the potential $A_1$ will be delivered to the pulse counter 23.

In order that the number of pulses counted N be equal to the value of Q the voltage divider is adjusted so that the potential $$A_1 = .0432 \, A_0$$

It is to be observed therefore that the present invention provides for a device to measure the Q of an LC circuit comprising in combination, a power source adapted to deliver a voltage $A_0$ across the capacitor of the LC circuit; switch means to discharge the capacitor into the inductance of the LC circuit; an amplifier stage fed by said LC circuit under test amplifying the damped wave output of said LC circuit: a clipper stage biased to cut off at a voltage of a value of $0.0432 \times A_0$; and a means of counting the pulses occurring at the time interval $t_1$.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A device to measure the Q of an LC circuit, comprising in combination,
   a power source circuit to deliver a fixed initial voltage across a capacitor of an LC circuit under test;
   switch means, which in a first position will place said capacitor of said LC circuit under test in the power source circuit, and in a second position will discharge said capacitor into the inductance of said LC circuit under test, starting a train of damped oscillations;
   an amplifier stage coupled to said LC circuit under test amplifying the damped wave output of said LC circuit;
   a diode clipper stage coupled on its input side to said amplifier stage furnishing on its output side, voltage output pulses which exceed a predetermined level;
   resistor bias cut-off means on the output side of said clipper stage to cut off the diode clipper stage at a voltage of a value of 0.0432 times said initial voltage; and,
   counter means counting the pulses between said fixed initial voltage and said cut-off voltage value.
2. A device as claimed in claim 1, said amplifier stage being a triode, with a cathode plate and grid, the cathode and plate being in parallel with said power source circuit, the grid being responsive to said LC circuit.

References Cited by the Examiner

UNITED STATES PATENTS

| | | | |
|---|---|---|---|
| 3,017,571 | 1/62 | Moricca et al. | 324—57 XR |
| 3,019,387 | 1/62 | Rowe | 324—77 XR |
| 3,020,750 | 2/62 | Briscoe | 324—57 XR |

OTHER REFERENCES

"The Q–Jig" article in Radio News, January 1944; page 35.

"Testing for Transients" article in Audio, April 1958; pages 26 and 27.

WALTER L. CARLSON, *Primary Examiner.*

SAMUEL BERNSTEIN, *Examiner.*